United States Patent [19]
Sargent et al.

[11] Patent Number: 5,257,668
[45] Date of Patent: Nov. 2, 1993

[54] MOUNTING AND REMOVAL SYSTEM FOR LOAD CELLS OF INDUSTRIAL WEIGHT SCALES

[75] Inventors: Michael P. Sargent; Timothy W. Williams, both of Huntsville, Ala.

[73] Assignee: Beowulf Corporation, Huntsville, Ala.

[21] Appl. No.: 833,057

[22] Filed: Feb. 10, 1992

[51] Int. Cl.$^5$ .................. G01G 19/52; G01G 23/01
[52] U.S. Cl. ................................. 177/146; 177/50
[58] Field of Search ........................... 177/50, 146

[56] References Cited

U.S. PATENT DOCUMENTS

| | | | |
|---|---|---|---|
| 2,925,728 | 2/1960 | MacDonald | 177/50 |
| 3,194,050 | 7/1965 | Ruge | 177/50 |
| 4,658,921 | 4/1987 | Karpa | 177/50 |

Primary Examiner—George H. Miller, Jr.
Attorney, Agent, or Firm—John C. Garvin, Jr.; James E. Staudt

[57] ABSTRACT

This invention relates to a system for mounting and removal of one or more electronic load cells (or similarly configured spacers) of the type used in heavy capacity industrial weight scales. In addition to the mounting of the load cells the system provides a means for the selective application or removal of weight normally applied to the load cells (or similarly configured spacers) through a scale apparatus. The system thus facilitates the testing, calibration, or replacement of the load cells.

19 Claims, 4 Drawing Sheets

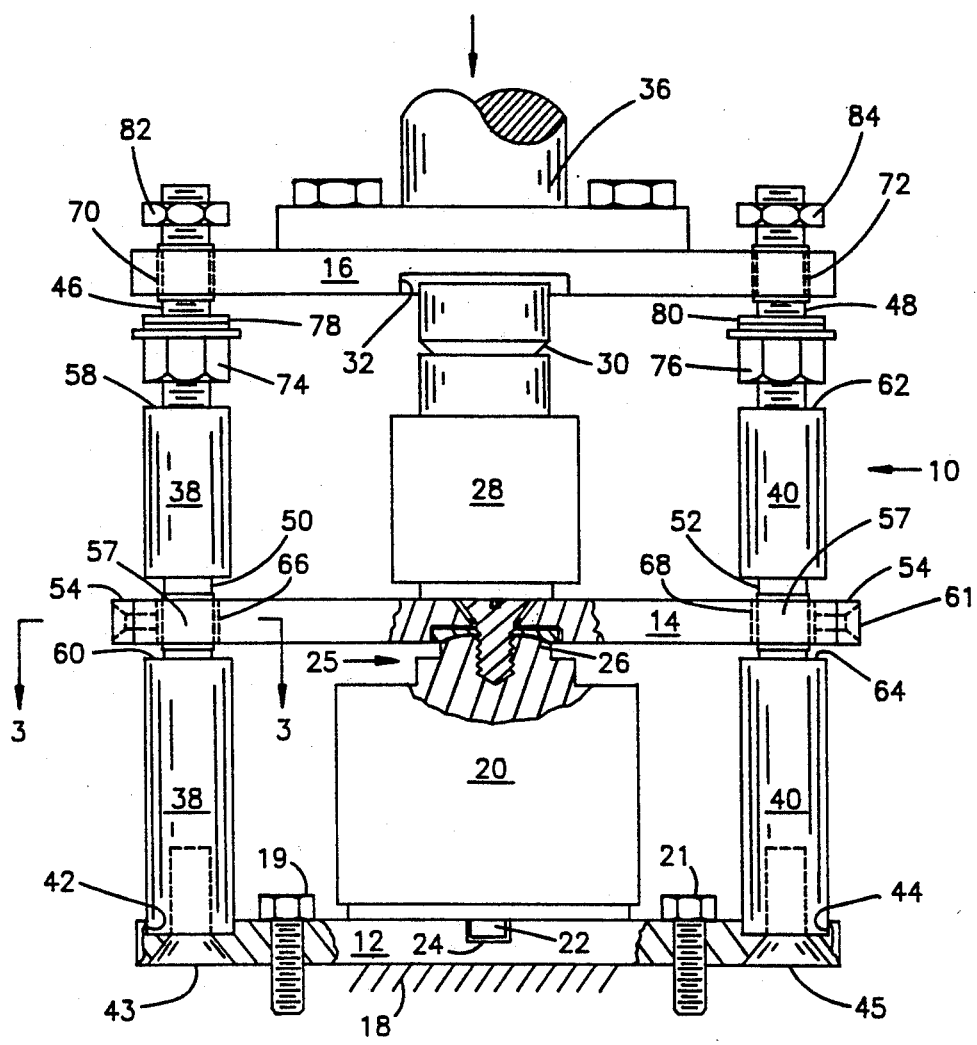
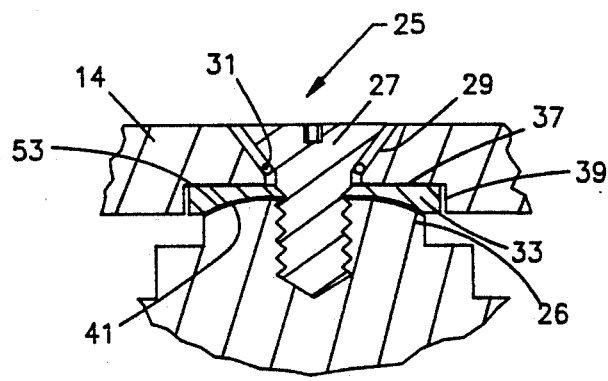
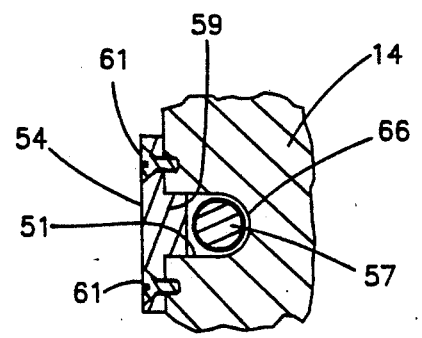
FIG. 1
FIG. 2
FIG. 3

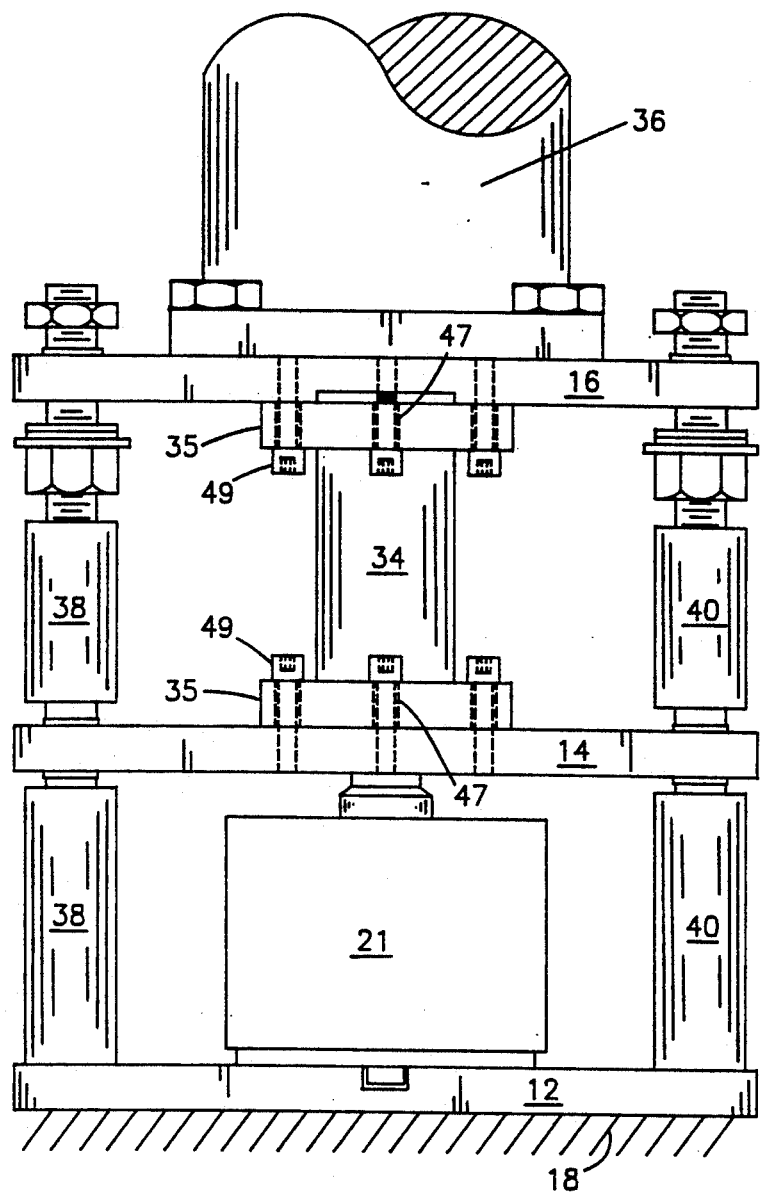
FIG. 6
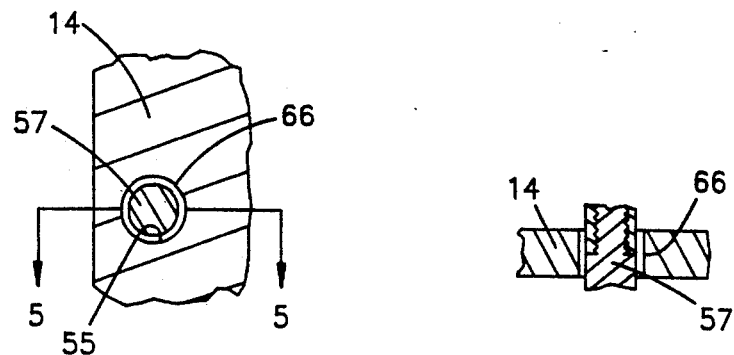
FIG. 4
FIG. 5

MOUNTING AND REMOVAL SYSTEM FOR LOAD CELLS OF INDUSTRIAL WEIGHT SCALES

BACKGROUND OF THE INVENTION (1) Field of the Invention

This invention relates to a system for mounting and removal of electronic type load cells of the type used in heavy capacity industrial weight scales. In addition to the accurate and stable mounting of the load cells the system provides a means for the selective application or removal of the weight normally applied to the load cells. The system thus facilitates the testing, calibration, and replacement of the load cells.

(2) Description of Related Art

Historically, the typical method of weight scale calibration consisted of adjustment of the scale to a zero reading with only the dead weight (the weight of containers and apparatus which are a permanent part of the scale) applied, and then to apply various known weights to the scale while making appropriate adjustments to the scale after the addition of each weight. This calibration method remains popular for smaller scales, and surprisingly remains in some use even on heavy capacity industrial scales. The problems commensurate with use of such a method for heavy capacity scales increase astronomically as the capacity of the scale to be calibrated increases. One can readily appreciate, for example the logistics of fabrication, transportation and handling a weight of many tons in an industrial environment.

Another and more sophisticated method of calibrating heavy capacity scales is called a "Force Calibration System". Systems of this type are designed to apply a measured force to the scale. These systems are extremely expensive to build and to use. The force which is applied to the scale is normally created by use of hydraulic jacks acting through cumbersome fixtures which are limited in the force which they can withstand. Thus, in many cases a heavy capacity scale can only be calibrated over a small portion of its rated capacity. Further, such systems have no means for including either dead weight or inherent site environmental problems such as uneven scale foundations in the calibration process.

State of the art electronic scales use load cells to provide the primary signals which, after appropriate processing, actuate the scale displays.

A load cell is a precision machined metallic device which will deflect under load and return to normal state when unloaded. Strain gages are affixed to the sensitive area of the device to measure the amount of deflection which occurs under load. The deflection of the cells is quite small, seldom exceeding 0.010 of an inch. The strain gages, in conjunction with appropriate electronic apparatus, produce a signal which varies proportionally and linearly as the weight applied to the load cell is varied. This signal is processed and fed to a display which reads the weight being applied to the cell. Industrial scales typically utilize a plurality of load cells for each weighing application. For example, a liquid tank would normally be supported by four legs with a load cell located under each leg.

Load cells may be basically categorized as working load cells, which remain in a scale apparatus during normal use, and as calibration load cells, which are employed for the calibration or testing of work cells. These types of load cells may be referred to as load bearing members in that each type is required to bear the entire weight being weighed by that load cell during a weighing operation.

Recent technology has produced a calibration procedure which is capable of testing and calibrating electronic load cells while in place. However, heretofore no effective means has been provided for the efficient utilization of such a system. The load cells often bear a great deal of weight and thus present a formidable problem of proper mounting of the load cells and of lifting the weight from the load cell when testing, calibration or replacement is required. The present invention provides a mounting and removal system for load cells, which system resolves the shortcomings of the prior art by permitting the efficient and economical use of modern load cells.

SUMMARY OF THE INVENTION

This invention provides a new and improved system which is designed specifically for the mounting and removal of electronic load cells to efficiently and economically facilitate testing, calibration and replacement of the cells.

While load cells are capable of accurate operation under extreme loads, they must be properly mounted to function effectively.

It is, therefore, an object of the present invention to provide a system which meets the requirements for proper mounting of a load cell, as well as for the efficient removal of the load when necessary.

It is also an object of this invention to provide a new and improved system which is relatively small, light and inexpensive while still being capable of supporting and lifting heavy loads.

It is a further object of this invention to overcome the disadvantages of the prior art described above while providing an effective system for utilization of state of the art weight scale apparatus.

Further objects, features, and advantages of the present invention will become more readily apparent from the following description, taken in conjunction with the accompanying drawings.

BRIEF DESCRIPTION OF THE DRAWINGS

FIG. 1 is an elevational view of the invention showing load cells mounted therein in a series arrangement.

FIG. 2 is an enlarged sectional view of the level compensation assembly which is illustrated in FIG. 1.

FIG. 3 is a sectional view taken along the line 3—3 in FIG. 1.

FIG. 4 is a sectional view similar to FIG. 3 but illustrating a modification of the intermediate guide plate shown in FIG. 3.

FIG. 5 is a sectional view taken along the line 5—5 of FIG. 4.

FIG. 6 is an elevational view of the invention as illustrated in FIG. 1 which shows the use of a spacer in place of a calibration type load cell.

DESCRIPTION OF PREFERRED EMBODIMENTS

Figure 7:
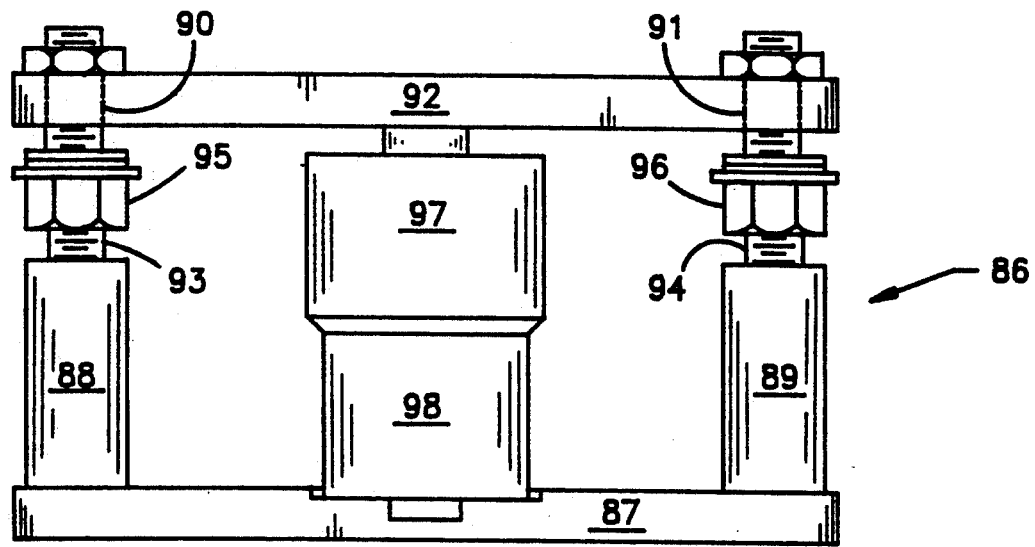
FIG. 7 is an elevational view of an alternate form of the invention.

The present invention is a mounting and removal system which is specifically adapted for the accurate mounting of load cells which are utilized by heavy capacity weight scales, and for the removal of the load cells to facilitate testing, calibration or replacement of the load cells.

Referring now to FIG. 1, the system for mounting and removal of load cells (hereinafter referred to as the "system") is shown generally by reference numeral 10. The system includes a frame structure having a base plate 12, which defines a load cell receiver member; an intermediate guide plate 14; an upper support plate 16; and a pair of pillars 38 and 40. Base plate 12 is of course the base of the frame structure and is firmly attached to a suitable support such as a floor or foundation 18 by bolts 19 and 21. A working load cell 20 rests upon the base plate 12 and includes an alignment boss 22 adapted to fit in a slot 24 formed in the center portion of the base plate 12. The slot 24 extends rearwardly to the middle of the base plate 12 and serves as a centering guide for load cell 20 during installation. As illustrated, the intermediate guide plate 14 rests upon, and is pivotally attached to a load carrying actuator 26 of the load cell 20. This pivotal attachment is accomplished by a level compensator assembly shown generally by the reference numeral 25.

This assembly 25 is located in the center portion of the intermediate guide plate 14 and is best illustrated in FIG. 2, which is an enlarged view of the assembly. The assembly includes a retainer screw 27 having a tapered head. The screw 27 passes through a tapered hole 29, a resilient ring 31 and a washer 33, and threadedly engages the actuator 26. The screw 27, as illustrated, is adapted for rotation by means of an "ALLEN" wrench, however any convenient screw and actuator configuration may be used. The washer 33 includes a flattened upper surface 37 which abuts the end surface of a recessed opening 39 which is formed in the bottom central surface of intermediate guide plate 14 at the termination of the tapered hole 29. The bottom surface 41 of the washer 33 has a concave configuration which pivotally engages the convex configuration of a dome 53 of the actuator 26. As a secondary function this level compensator assembly serves to level the intermediate guide plate 14 with respect to the base plate 12 during the initial set up of the lifting system. This is accomplished by tightening the retaining screw 27 until it bottoms out in the actuator button 26. This bottoming occurs at a point which leaves a space between the tapered hole 29 and the retainer screw 27. The resilient ring 31 is configured to be partially compressed as the retainer screw is tightened. This compression force which is evenly applied between the retainer screw 27 and the tapered hole 29 is sufficient to level the intermediate guide plate with respect to the base plate 12 during assembly. However, the primary function of the level compensator assembly is the proper mounting and alignment of the load carrying components during a weighing operation. This function is accomplished as the level compensator allows a degree of misalignment between the load bearing elements of the system without placing undue lateral forces upon the load cell 20. Application of such lateral forces to a load cell can cause erroneous weight readings and in extreme cases damage to the load cell.

A calibration load cell 28, rests upon the intermediate guide plate 14. As illustrated, the calibration load cell 28 is smaller than the working load cell 20. While the smaller size permits its use in confined areas, the calibration load cell 28 could, of course, be constructed to duplicate the size of the working load cell if desired. The calibration load cell when attached to load cell 20 through appropriate calibration equipment (not shown) is capable of complete testing and calibration of the working load cell 20. This operation is performed without the use of external force or the addition or subtraction of weight applied to the scale, as was necessary in previous testing or calibration procedures.

The upper support plate 16 rests upon a load carrying adapter 30 which adapts the smaller calibration load to areas designed to accommodate larger permanently placed working load cells such as 20. An indentation 32 is formed in the central lower surface of the upper support plate 16 to receive the adapter 30, or a washer 33 such as would be used with a working load cell. A load bearing leg 36 is attached at its lower end by suitable means, such as bolting, to the top surface of upper support plate 16. The upper end of load bearing leg 36 is attached to a device, (not shown) which is to be weighed. Typically, devices weighed by heavy capacity industrial scales are of a symmetrical type, which is to say the devices have a plurality of legs or similar support structures, each of which bears approximately the same weight. A system, such as the disclosed invention, would be utilized for each leg in the same manner as illustrated in FIG. 1. To accomplish the task of lifting an applied weight from the load cells, a pair of pillars 38 and 40 are utilized. The pillars 38 and 40 include enlarged portions 58, 60, 62 and 64 respectively and smaller diameter relieved portions 50 and 52 respectively. The pillars 38 and 40 are supported at the lower ends thereof by base plate 12, and are retained in indentations 42 and 44 by bolts 43 and 45, as well as by welding if necessary. The distal ends of pillars 38 and 40 are provided with threaded portions 46 and 48 respectively which pass through apertures 70 and 72 respectively in the upper support plate 16. These apertures may be formed as either holes or slots. The pillars 38 and 40 also pass through apertures 66 and 68 respectively, each of which is formed in one end of the intermediate guide plate 14. As illustrated in FIGS. 3 and 4, these apertures may be in the form of a slot 51 or a hole 55 respectively. For applications which require the lifting of extremely heavy weights, the slots 51 and 53 may, as illustrated in FIGS. 3, 4 and 5 be closed at the open end thereof to provide additional support for the pillars 38 and 40. FIG. 3 shows the closure of slot 51 by a guide block 54 having a protrusion 59 which extends into the slot 51. The guide block 54 is secured by a pair of bolts 61. As illustrated in FIG. 1, a guide block 54 is utilized in like manner with respect to aperture 68 located opposite aperture 66 on the intermediate guide plate 14. The configuration illustrated in FIG. 4 accomplishes the pillar support by forming the aperture 66 as a hole 55. When utilizing this modified form, a similar hole would of course be located on each end of the intermediate guide plate. As illustrated in FIG. 5, this alternate configuration requires that pillars 3 and 40 be formed in two sections which are referred to as legs. The legs of the pillars 38 and 40 meet in the are of the holes to facilitate assembly of the system, since the larger diameter portions of the pillars will not pass through the smaller diameter holes. The legs of the two piece pillars may be abutted to one another or attached in any suitable way such as by threading, as illustrated in FIG. 5. While FIGS. 4 and 5 illustrate only the alternate configuration of pillar 38 and the aperture 66, it will be understood that the alternate form is also utilized with respect to pillar 40 and aperture 68. It is pointed out that in either of the pillar support adaptations, the narrowed portions of the columns would fit the holes with some clearance to permit unhampered vertical movement of the intermediate guide plate 14 during a weighing operation. However, this clearance is kept to a minimum to insure that any bending the pillar might experience at its narrow center portion will be immediately halted by contact of the narrow portions of the pillars with the walls of the holes. The minimal flexing of the pillars during a lifting operation is well within the elastic limits of the pillars. Accordingly, the pillars return to their original configuration upon release of the load from the pillars. In this way the narrowed portions 50, 52 of pillars 38 and 40 have a strength approaching that of the enlarged portions 58, 60, 62 and 64 of pillars 38 and 40.

A pair of high lift capacity rotatable components 74 and 76, which may be configured generally as machine nuts, are positioned immediately below the upper support plate 16 and are threadedly attached to the threaded portions 46, 48 of pillars 38 and 40 respectively. A pair of high lift capacity bearing washers 78 and 80 are positioned between the rotatable components 74 and 76 respectively and the upper support plate 16. The construction of the rotatable components and the bearing washers is dependent upon the weight which will be applied to the upper support plate by the object to be weighted. For example, for heavy weights the vertical length of the rotatable components 74 and 76 is increased and washers 78 and 80 include roller bearings imbedded therein. A pair of conventional machine nuts 82 and 84 are positioned above the upper support plate 16 and are threadedly attached to the threaded portions 46 and 48 respectively of pillars 38 and 40. The nuts 82 and 84, through the upper support plate 16, the pillars 38 and 40 and the base plate 12, anchor the device to be weighted, to the support 18. Thus, the system provides a firm foundation for the device being weighed, as well as the scale apparatus, and affords a considerable degree of protection in the event of a natural disaster such as an earthquake or hurricane.

In operation of the system illustrated in FIG. 1, either the load cell 20 or the calibration load cell 28 may be removed and replaced. This is accomplished by rotation of the rotatable components 74 and 76 in the appropriate direction to raise the upper support plate. This relieves the weight applied by leg 36 from both load cells of the series arrangement of the load cells 20 and 28.

FIG. 6 shows the system illustrated in FIG. 1, but wherein a spacer 34 rather than the calibration load cell 28 is positioned between the intermediate guide plate 14 and the upper support plate 16. As will be pointed out, the versatility of this system has been greatly increased by the use of load bearing members such as spacer 34. Such spacers are configured to duplicate the critical dimensions of a load cell and may be substituted for load cells as dictated by the most efficient operation of the system. The spacer 34 includes upper and lower identically configured mounting brackets 35, each having three slots 4 adapted to received "ALLEN" bolts 49 which threadedly engage the upper support plate 16 and the intermediate guide plate 14. The spacer 34 is utilized during normal use of the system when a calibration load cell is not necessary. If a check of the weight scales accuracy becomes necessary, then the lifting components of the system are used to remove the weight from the spacer 34 and the load cell 21. The spacer may then be replaced with a calibration load cell such as 28 or if necessary, the load cell 21 may be replaced. It is pointed out that the bolt pattern for bolts 49 is configured to accurately center and retain a calibration load cell by insertion of the bolts in the holes threaded in the upper support plate 16 and the intermediate support plate 14. Since a calibration load cell has no mounting holes or slots to receive the bolts 49, the centering of the calibration load cell is accomplished by abutment of the circular bolt heads of the "ALLEN" bolts against the outer cylindrical surface of the calibration load cell.

Referring now to FIG. 7, a system which is an adaptation of that shown in FIG. 1 is illustrated. It will be noted that the basic difference between the systems is the removal of the intermediate guide plate 14 from the system illustrated in FIG. 1. The system referenced generally by numeral 86, includes a frame having a base plate 87, which is a load cell receiving member, and pillars 88 and 89 which extend upwardly from base plate 87 and pass through holes 90 and 91 formed in an upper support plate 92. The upper ends of the pillars 88 and 89 include threaded portions 93 and 94 which extend above and below the upper support plate 92. A pair of rotatable lift elements 95 and 96 threadedly engage the threaded portions 93 and 94 immediately below the upper support plate 92. A calibration load cell 97 and a spacer 98 are positioned in series between the base plate 87 and the upper support plate 92. While this illustration shows a calibration load cell, it is understood that during normal operation a working load cell is utilized. It will be noted that the general operation, the arrangement, and the attachment of the various components of this modified system are the same or similar to those of the system illustrated in FIG. 1. This adaptation of the system is, of course, considerably more compact than that disclosed in FIG. 1, making it a desirable choice in confined areas and in applications which do not require a level compensator such as that illustrated in FIG. 2. It is designed to provide a simplified replacement of the calibration load cell 97 and the spacer 98 with a working load cell, such as the load cell 20 illustrated in FIG. 1.

Figure 8:
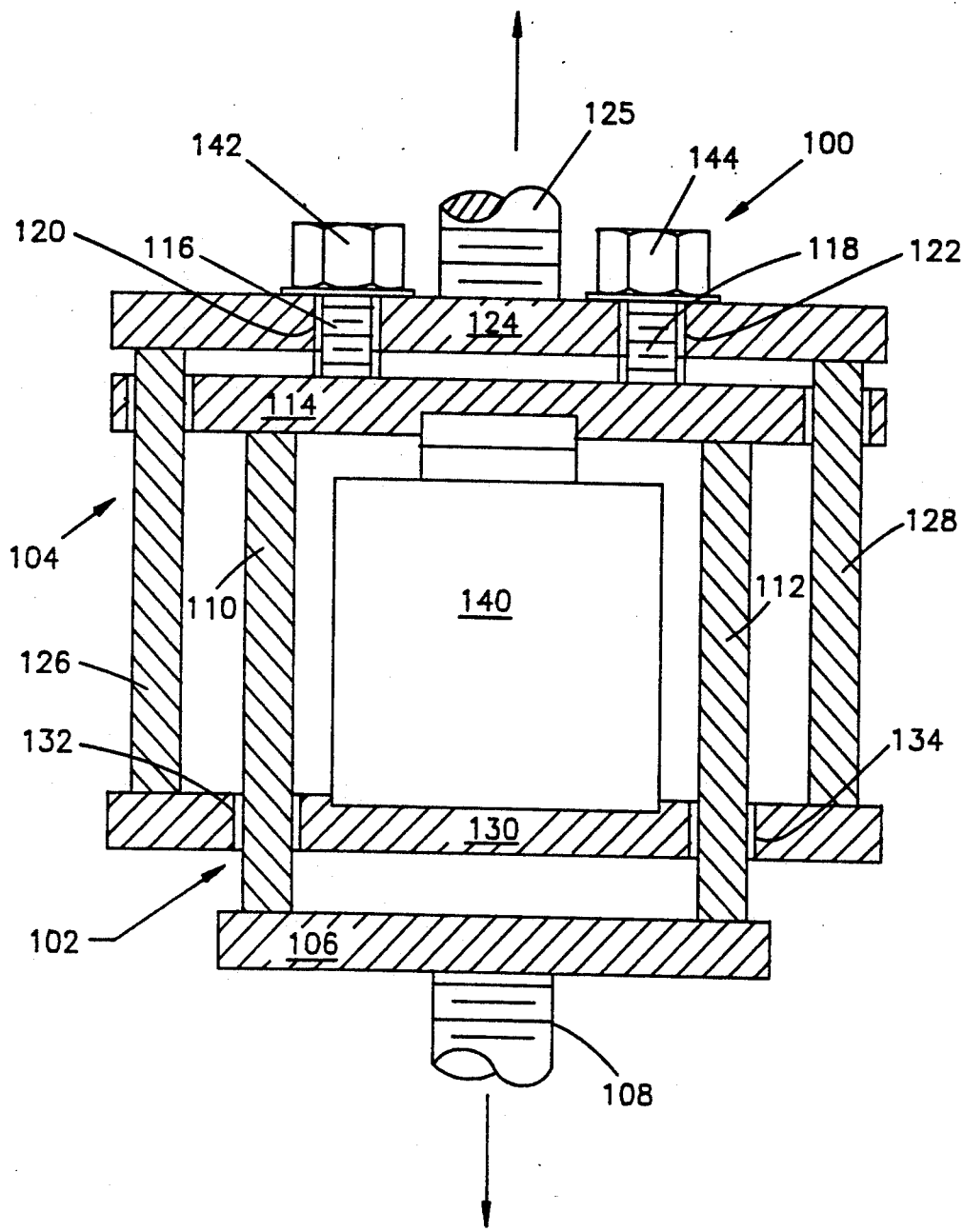
FIG. 8 is an elevational view of the invention showing a configuration which is designed for use in a tension type industrial weight scale.

Referring now to FIG. 8, the system illustrated generally by the numeral 100, is of the type utilized in conjunction with a tension type, heavy capacity industrial weight scale. The system 100 includes a frame having a pair of cages. A first cage is referred to generally by numeral 102 and a second cage is referred to generally by numeral 104. The first cage includes a first base plate 106 which is attached to a first tension pole 108 which in turn is affixed to a device (not shown) which is to be weighed. Attached to the first base plate is a first pair of pillars 110 and 112 which extend upwardly and connect to a first upper support plate 114. A pair of threaded rods 116 and 118 are attached to and extend upwardly from said first upper support plate. The threaded rods pass through a pair of apertures 120 and 122 which are formed in a second upper support plate 124. Attached to and extending upwardly from said second upper support plate is a second tension pole 125, which is a part of the weight scale (not shown). Also attached at one end to said second upper support plate 124 and extending downwardly therefrom are a second pair of pillars 126 and 128. The distal ends of the pillars 126 and 128 are attached to a second base plate 130, which is a load cell receiving member. The second base plate 130 is provided with a pair of apertures 132 and 134 through which pass the first pillars 110 and 112 respectively. A load cell 140 is mounted between said load cell receiving base plate 130 and said first upper support plate 114. It will be understood that a load cell, a spacer, a calibrating load cell or any desired combination thereof may also be utilized. To provide a lifting connection between said first and second cages a pair of rotatable components 142 and 144 threadedly engage the threaded rods 116 and 118 respectively.

In operation of the system as illustrated in FIG. 8, it will be understood that rotation and movement of the rotatable components in the downward direction will move the first and second cages relative to one another in a manner which will relieve all weight which would normally be applied to the load cell 140. This permits removal and replacement of the load cell 140 with either a calibration load cell or another working load cell as needs may dictate. Having replaced or repaired the load cell, reversal of the procedure will immediately place the scale back in normal operation.

While I have shown my invention in but one form, it will be obvious to those skilled in the art that it is not so limited, but is susceptible of various other changes and modifications without departing from the spirit thereof.

I claim:

1. A mounting and removal system for a load cell, which load cell is adapted to provide a signal in response to a weight applied thereto, said system comprising frame means adapted to mount said load cell therein, said frame means having a load cell receiving base plate, and at least one upper support; means connecting said load cell receiving base plate to said upper support plate; and lift means attached to said frame means, said lift means being independent of said weight and adapted to selectively remove said weight from said load cell or to apply said weight to said load cell.

2. A system as set forth in claim 1 wherein at least one of said load cell receiving base plate and said upper support plate is adapted to prevent lateral movement of said load cell within said frame means.

3. A system as set forth in claim 2 wherein said lift means includes threaded components.

4. A system as set forth in claim 3 wherein said load cell receiving base plate and said upper support plate each include a center portion and a pair of end portions, and wherein said connecting means includes a pair of pillars, each of said pillars being mounted at one end thereof to one end portion of said load cell receiving base plate and passing through one end portion of said upper support plate, and wherein said threaded components include a threaded portion on the distal end of each of said pillars, and wherein said threaded portion extends above and below the said upper support plate, and wherein said threaded components further include a pair of threaded rotatable members, one of said threaded rotatable members being threadedly engaged to the threaded portion of each of said pillars, below said upper support plate.

5. A system as set forth in claim 4 wherein said frame means further includes an intermediate guide plate having a center portion and a pair of end portions, each of said end portions at least partially encompassing one of said pillars and wherein said intermediate guide plate is positioned between said load cell receiving base plate and said upper support plate so as to accommodate a load cell or a similarly configured object between said load cell receiving base plate and said intermediate guide plate, as well as between said intermediate guide plate and said upper support plate.

6. A system as set forth in claim 5 wherein said intermediate guide plate includes means for pivotal attachment of said intermediate guide plate to said load cell.

7. A system as set forth in claim 6 wherein said intermediate guide plate is provided with a tapered hole which terminates with a recessed opening; a load cell positioned between said intermediate guide plate and said load cell receiving base plate, said load cell having a dome shaped actuator positioned adjacent said intermediate guide plate, said dome shaped actuator having a threaded hole positioned in the domed portion thereof in alignment with said tapered hole and recessed opening of said guide plate, and wherein said pivotal attachment means includes: a washer positioned in said recessed opening, said washer having an upper flattened surface abutting said intermediate guide plate within said recessed opening and a concave lower surface abutting said dome shaped actuator; a threaded screw means passing through said tapered hole in said intermediate guide plate and threadedly engaging said threaded hole in said dome shaped actuator; and a resilient ring positioned between said threaded screw means and said tapered hole, said resilient ring being adapted to permit a limited pivotal movement between said dome shaped actuator and said intermediate guide plate.

8. A system as set forth in claim 5 wherein said means to prevent lateral movement of said load cell within said frame means is adapted to rigidly attach said similarly configured spacer between said load cell receiving base plate and said intermediate guide plate, as well as between said intermediate guide late and said upper support plate.

9. A system as set forth in claim 8 wherein said means to prevent lateral movement of said load cell within said frame means comprises at least three threaded members.

10. A system as set forth in claim 9 wherein said threaded members are bolts having circular head portion thereon and wherein said circular head portions are adapted to abut said load cell so as to accurately position said load cell in said frame means.

11. A system as s et forth in claim 1 wherein said load cell receiving base plate and said upper support plate have at least two spaced apart apertures therein; at least two pillars, each of said pillars being founded at one end thereof upon said load cell receiving base plate and having a threaded portion at the distal end thereof, each of said threaded portions of said pillars passing freely through one of said apertures in said upper support plate, and wherein said lift means includes each of said threaded portions and at least one rotatable component threadedly engaged to said threaded portion of each said pillars below said upper guide plate and adapted to selectively raise or lower said upper guide plate upon rotation of said rotatable component.

12. A system as set forth in claim 1 wherein said frame means includes an intermediate guide plate, at least two spaced apart apertures in each said intermediate guide plate and said upper support plates; and wherein said lift means includes at least two pillars, each of said pillars being founded at one end thereof upon said load cell receiving base plate and having a threaded portion at the distal end thereof, each of said pillars passing freely through one of the apertures in said intermediate guide through one of the apertures in said intermediate guide plate and one of the apertures in said upper support plate, and wherein said threaded portions of said pillars pass through the openings in said upper support plate and extend above and below said upper support plate; and at least one rotatable component; said rotatable component being threadedly engaged to each of said threaded portions below said upper guide plate and adapted to selectively raise or lower said upper support plate upon rotation thereof.

13. A system as set forth in claim 12 wherein at least one rotatable component is threadedly engaged to each of said threaded portions above said upper support plate.

14. A system as set forth in claim 13 wherein said apertures in said intermediate guide plate comprise slots opening outwardly from the ends of said intermediate guide plate.

15. A system as set forth in claim 14 including a pair of guide blocks removably attached to said intermediate guide plate, one of said guide blocks extending across the opening in each of said slots.

16. A system as set forth in claim 12 wherein said apertures are in the form of holes surrounding each of said pillars.

17. A system as set forth in claim 16 wherein each of said pillars consists of a pair of separable legs, each of said legs engaging another within the confines of said intermediate guide plate.

18. A mounting and removal system for a load cell, which load cell is adapted to provide a signal in response to a weight applied thereto, said system comprising frame means having a first cage and a second cage, said first cage having a first base plate, a first upper support plate, and first pillar means attaching said first base plate to said first upper support plate, said second cage having a load cell receiving base plate, a second upper support plate spaced apart from and above said first upper support plate, and a second pillar means attaching said load cell receiving base plate to said second upper support plate; said first and second cages being adapted to accommodate said load cell between said first upper support plate and load cell receiving base plate, and wherein said lift means is adapted to lift said first cage with respect to said second cage.

19. A system as set forth in claim wherein said second upper support plate is provided with a pair of apertures therein and wherein said lift means further includes a pair of threaded members attached to said first upper support plate and wherein each of said threaded members pass through one of said apertures in said upper support plate nd wherein a rotatable component is threadedly attached to each of said threaded members immediately above said second upper support plate and is adapted for rotation for selectively raising or lowering said first and second cages relative to one another.

* * * * *